(12) United States Patent
Kraus

(10) Patent No.: US 7,462,954 B2
(45) Date of Patent: Dec. 9, 2008

(54) APPARATUS FOR PROVIDING HIGH QUALITY POWER

(75) Inventor: Rudy Kraus, Newtown, CT (US)

(73) Assignee: Validus DC Power Systems, LLC, Brookfield, CT (US)

( * ) Notice: Subject to any disclaimer, the term of this patent is extended or adjusted under 35 U.S.C. 154(b) by 0 days.

(21) Appl. No.: 11/593,859

(22) Filed: Nov. 7, 2006

(65) Prior Publication Data

US 2007/0052294 A1 Mar. 8, 2007

Related U.S. Application Data

(63) Continuation of application No. 10/700,076, filed on Nov. 3, 2003, now Pat. No. 7,141,894.

(60) Provisional application No. 60/423,127, filed on Nov. 1, 2002, provisional application No. 60/453,235, filed on Mar. 10, 2003.

(51) Int. Cl.
*H02J 7/00* (2006.01)
(52) U.S. Cl. ....................................................... 307/64
(58) Field of Classification Search ................ 307/64
See application file for complete search history.

(56) References Cited

U.S. PATENT DOCUMENTS

| | | | |
|---|---|---|---|
| 4,239,978 A | 12/1980 | Kofink ........................ | 307/16 |
| 4,277,692 A | 7/1981 | Small ......................... | 307/66 |
| 4,761,563 A | 8/1988 | Ross et al. .................. | 307/87 |
| 4,811,185 A | 3/1989 | Cook et al. ................. | 363/17 |
| 5,010,469 A | 4/1991 | Bobry .......................... | 363/37 |
| 5,057,697 A | 10/1991 | Hammond et al. .......... | 307/66 |
| 5,126,585 A | 6/1992 | Boys ............................ | 307/66 |
| 5,247,205 A | 9/1993 | Mototani et al. ............. | 307/66 |
| 5,444,610 A | 8/1995 | Gaudreau .................... | 363/54 |
| 5,483,463 A | 1/1996 | Qin et al. .................... | 700/297 |
| 5,576,940 A | 11/1996 | Steigerwald et al. ........ | 363/17 |
| 5,612,581 A | 3/1997 | Kageyama .................. | 307/64 |
| 5,646,833 A | 7/1997 | Gaudreau et al. ........... | 363/54 |
| 5,784,626 A | 7/1998 | Odaohara .................... | 713/300 |
| 5,844,329 A | 12/1998 | Bailey et al. ................ | 307/66 |
| 5,894,412 A | 4/1999 | Faulk .......................... | 363/17 |
| 5,942,811 A | 8/1999 | Stumfall et al. ............. | 307/64 |
| 6,043,636 A | 3/2000 | Gaudreau et al. ........... | 323/282 |
| 6,157,168 A | 12/2000 | Malik .......................... | 320/128 |
| 6,184,593 B1 * | 2/2001 | Jungreis ...................... | 307/64 |
| 6,225,708 B1 | 5/2001 | Furukawa et al. ........... | 307/66 |
| 6,240,337 B1 | 5/2001 | Marr, Jr. et al. ............. | 700/286 |
| 6,396,725 B1 | 5/2002 | Jacobs et al. ................ | 363/131 |
| 6,463,738 B1 | 10/2002 | Pinkerton et al. ........... | 60/646 |

(Continued)

FOREIGN PATENT DOCUMENTS

WO  WO 01/93410 A  12/2001

*Primary Examiner*—Robert L. DeBeradinis
(74) *Attorney, Agent, or Firm*—Wildman, Harrold, Allen & Dixon LLP

(57) ABSTRACT

There is provided a system that includes (a) a power feed that distributes a high DC voltage in a building, where the high DC voltage is in a range of about 300 to 600 VDC, (b) a converter, coupled to the power feed, that receives the high DC voltage, and scales the high DC voltage to a low DC voltage, and (c) a controller that controls a firing rate of the converter so that the low DC voltage is in a range of about 23 to 48 VDC.

5 Claims, 10 Drawing Sheets

U.S. PATENT DOCUMENTS

| | | | |
|---|---|---|---|
| 6,487,096 B1 | 11/2002 | Gilbreth et al. | 363/35 |
| 6,507,506 B1 | 1/2003 | Pinas et al. | 363/79 |
| 6,583,519 B2 | 6/2003 | Aberle et al. | 307/10.1 |
| 6,683,389 B2 | 1/2004 | Geis | 290/40 C |
| 6,737,301 B2 * | 5/2004 | Eden et al. | 438/128 |
| 6,737,763 B2 | 5/2004 | Liu et al. | 307/58 |
| 6,746,250 B2 | 6/2004 | Blutbacher | 439/34 |
| 6,762,595 B2 | 7/2004 | Tamai et al. | 323/266 |
| 6,960,838 B2 | 11/2005 | Johnson | 290/2 |
| 7,141,894 B2 * | 11/2006 | Kraus | 307/65 |
| 2002/0001210 A1 * | 1/2002 | Kuranuki et al. | 363/98 |

* cited by examiner

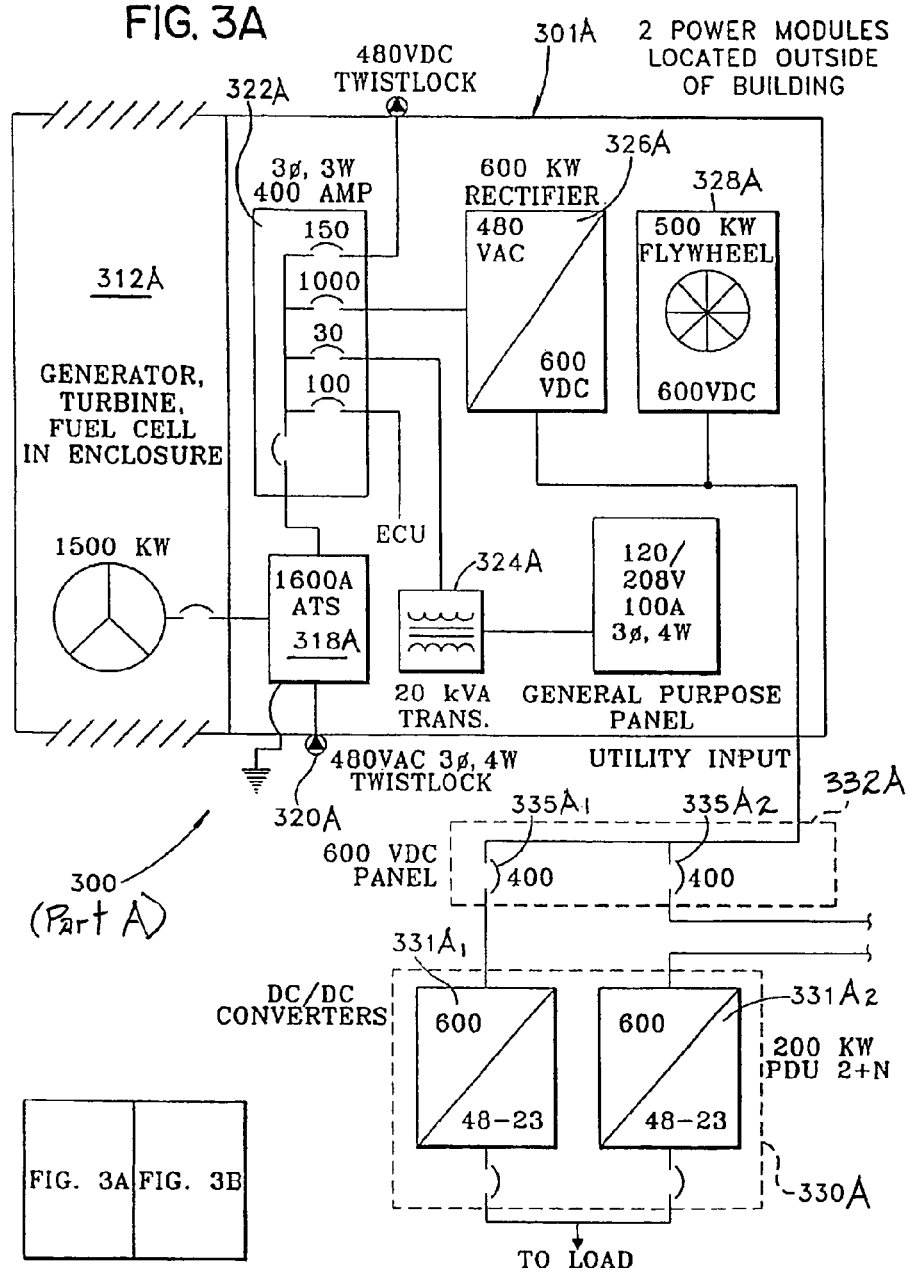

APPARATUS FOR PROVIDING HIGH QUALITY POWER

CROSS-REFERENCE TO RELATED APPLICATION

The present application is a continuation of U.S. patent application Ser. No. 10/700,076, filed Nov. 3, 2003, now U.S. Pat. No. 7,141,894 which claims priority to U.S. Provisional Patent Application No. 60/423,127 filed Nov. 1, 2002 and U.S. Provisional Patent Application No. 60/453,235 filed Mar. 10, 2003. The content of each of the above-noted applications is herein incorporated by reference in its entirety.

BACKGROUND OF THE INVENTION

1. Field of the Invention

The subject disclosure relates to systems for providing high quality power, and cooling and more particularly to an improved system for providing uninterrupted DC power for the telephone communications, data processing and industrial equipment.

2. Background of the Related Art

Traditionally, AC commercial power has been used as the primary power source for a wide variety of applications such as computers, data processing equipment, telephony circuitry and other solid state technology devices. Despite this proliferation of the use of AC power, various problems are well-known. For example, U.S. Pat. Nos. 4,277,692; 5,126,585; and 5,483,463 disclose practices for improving the performance of AC power devices. Despite these improvements, many drawbacks to the AC power still have not been overcome. In particular, AC power must still be converted to DC power for consumption by the majority of solid state devices. Many AC power systems require battery backup and second 100% rated redundant feeds and are still inefficient at supplying the necessary power and redundancy. Further, the safety risk, bulkiness and expense of distributing AC power is well documented.

Many have always considered DC to be more efficient and reliable. However, the prior ability to produce DC power and scale distribution thereof has been a hurdle yet to be overcome. Typically, chemical batteries and rectifiers are utilized to produce, distribute and backup critical DC power. Batteries in such applications have many limitations. When the batteries age, capacity reduces to the point of requiring replacement that creates a disposal problem. Further, the ability to produce and draw large amounts of power from a DC battery system is dependant upon the amount and size of the batteries and require large distribution systems as DC distribution systems are oversized for DC voltage drop. Modern technology demands more power, requiring a higher concentration of DC power to reach a higher level of operation.

Despite these and other drawbacks, use of chemical batteries has been widely used in to produce and store 48V DC power, in telecommunication centers and to provide an alternative backup source for AC voltage systems during power outages in data centers. For example, see U.S. Pat. No. 5,010,469 to Bobry, in which batteries are used and which is incorporated by reference herein in its entirety to the extent that it does not conflict with the present disclosure. Moreover, switching between sources is a recognized problem and often incurs momentary lapses in provision of the power needed. For example, see U.S. Pat. No. 5,057,697 to Hammond et al. which is incorporated by reference herein in its entirety to the extent that it does not conflict with the present disclosure.

In the past no technology has been available to economically produce and distribute highly reliable high capacity DC power for use in both centers. The use of DC quality power is much more reliable, inexpensive and would result in tremendous saving of power so it would be extremely desirable to extensively utilize scaleable DC power. However, as a result of not being able to scale DC power much like an AC transformer for distribution, technology dependent upon ready access to DC power has stagnated. Therefore, a system is needed to produce DC voltage that is highly reliable, scalable and economical utilizing AC and DC components without the use of chemical storage batteries.

Moreover, prior art systems have required large amounts of wiring and conditioning equipment for electrically interconnecting the AC voltage source with the load. Typically, the electrical interconections are quite bulky and require a large amount of copper. In data center and telco applications, switch mode power supplies ("SMPS") on the servers are fed by AC but have the capability of being powered by DC only. Theses AC driven SMPS generate heat and draw significant power and are very inefficient. As a result of the high heat generation and a limited amount of cooling capacity, data processing equipment must be spread out to facilitate proper cooling, therefore data centers have less space for processing equipment and an overall decreased cooling load efficiency. Thus, there is a need for a system which provides the necessary power and can be interconnected with relatively small interconnections and operate without SMPS in order to increase the efficiency of the data center.

SUMMARY OF THE INVENTION

It is an object of the present disclosure to utilize either 208-480 incoming volts AC three phase power to produce 23-48VDC outgoing voltage and current for supply throughout a data center or comparable facility.

It is another object of the present disclosure to utilize one AC utility and emergency power source, preferably a generator, as the incoming main and emergency feeds to make the system reliable in case of a utility power outage.

In one embodiment, the system cycles through a transfer switch with overlap transition to utility, optional. The transfer switch will take one emergency and one utility and will switch between the two when either manually initiated or loss of utility power has occurred. The generator will feed a distribution panel sized to power a bridge diode rectifier, house loads and air conditioning, utilizing 480/3/60 input and 300-600 VDC output. The rectifier will be designed to reduce DC ripple. In another embodiment, the system will utilize a flywheel battery-less DC power supply source, in parallel to the output of a main rectifier, to generate 300-600 VDC and tie into the output of the rectifier. The system utilizes DC output power from the rectifier to charge the flywheel. When AC power is lost to the main rectifier input, the flywheel will discharge the kinetic storage into the load side of the rectifier until such time that the emergency generator has started and has taken over the critical load. When the emergency source is on line it will supply power to both the load and will also recharge the flywheel device to 100% preparing the system for the eventual return to utility. Upon the return or stabilization of utility power consistently for a set period, the transfer switch will retransfer the system load to the utility. During this transfer, the break in the system power will once again be bridged by the flywheel source in the opposite direction.

Preferably, the 300-600 VDC from the output of the main rectifier will distribute throughout the facility reducing both the wire size and the current necessary to run a Power Converter Unit or PCU that will step the high voltage down to useable 23-48 VDC to power plants or computers that are designed to utilize 23-48 volts DC. Thereby allowing the computers to be supplied without a customary switch mode power supply therefore reducing the inefficiencies of the SMPS saving energy of up to 30% and reducing wiring circular mill, reducing cooling requirements, rid the plant of chemical storage batteries and reduce its equipment infrastructure required spacing and significantly increasing the power reliability. This attribute will allow more of the critical indoor square footage to be utilized for the electronics necessary to increase business.

In another embodiment, at certain determined interval areas, dependant upon loading and distance, a specially designed DC-to-DC converter, or Power Converter Unit ("PCU"), utilizing intergate bi-polar transistor (hereinafter "IGBT") technology, redundant power supplies or 30 kW drawers and a 5-20 kHz DC controller that both senses and fires an IGBT will be placed. The PCU can be fed by up to two totally independent power systems providing highly reliable outage protection. Additionally, the PCU is highly resistant to faults and once again adding to the high quality power output. The IGBT will efficiently convert line side DC high voltage to secondary low side voltage remaining efficient and tightly controlled throughout the potential voltage drop on the primary side down to 300 VDC. This PCU is much like a DC to DC transformer. From the output of the IGBT device, voltage and current will be distributed to local or close devices that utilize 48 volts DC without the issues of voltage drop and excessive heat produced by the SMPS. This voltage can be controlled by remotely placing a sensor at the furthest device from the converter.

Another highly important concept to this power quality system is the utilization of a sophisticated cooling system to rid the space of the heat produced by the efficient delivery of power by the PCU to the telecommunications and data processing loads. The PCU will deliver power to racks where the technology will reside. Virtually all of the delivered power will be utilized by electronic loads. These loads will turn this power completely into heat. Technology today is attempting to compact as many devices in as small a space as possible. In order to provide for this condition, a Power Cooling rack (PCR) will be provided that can liquid cool a plate fin heat exchanger located in the bottom of the rack as well as variable speed fans that will efficiently meter air and will cool the computers in the rack up to 20 kW. The best device being utilized today can rid the space of up to 5-7 kW. These racks will provide for dual fed 48 volt DC distribution for protection against power outage of one of the sources increasing reliability.

It should be appreciated that the present disclosure can be implemented in numerous ways, including without limitation as a process, an apparatus, a system, a device or a method. These and other unique features of the system disclosed herein will become more readily apparent from the following description and the accompanying drawings.

BRIEF DESCRIPTION OF THE DRAWINGS

So that those having ordinary skill in the art to which the disclosed system appertains will more readily understand how to make and use the same, reference may be had to the drawings wherein.

DETAILED DESCRIPTION OF THE PREFERRED EMBODIMENTS

Figure 1:
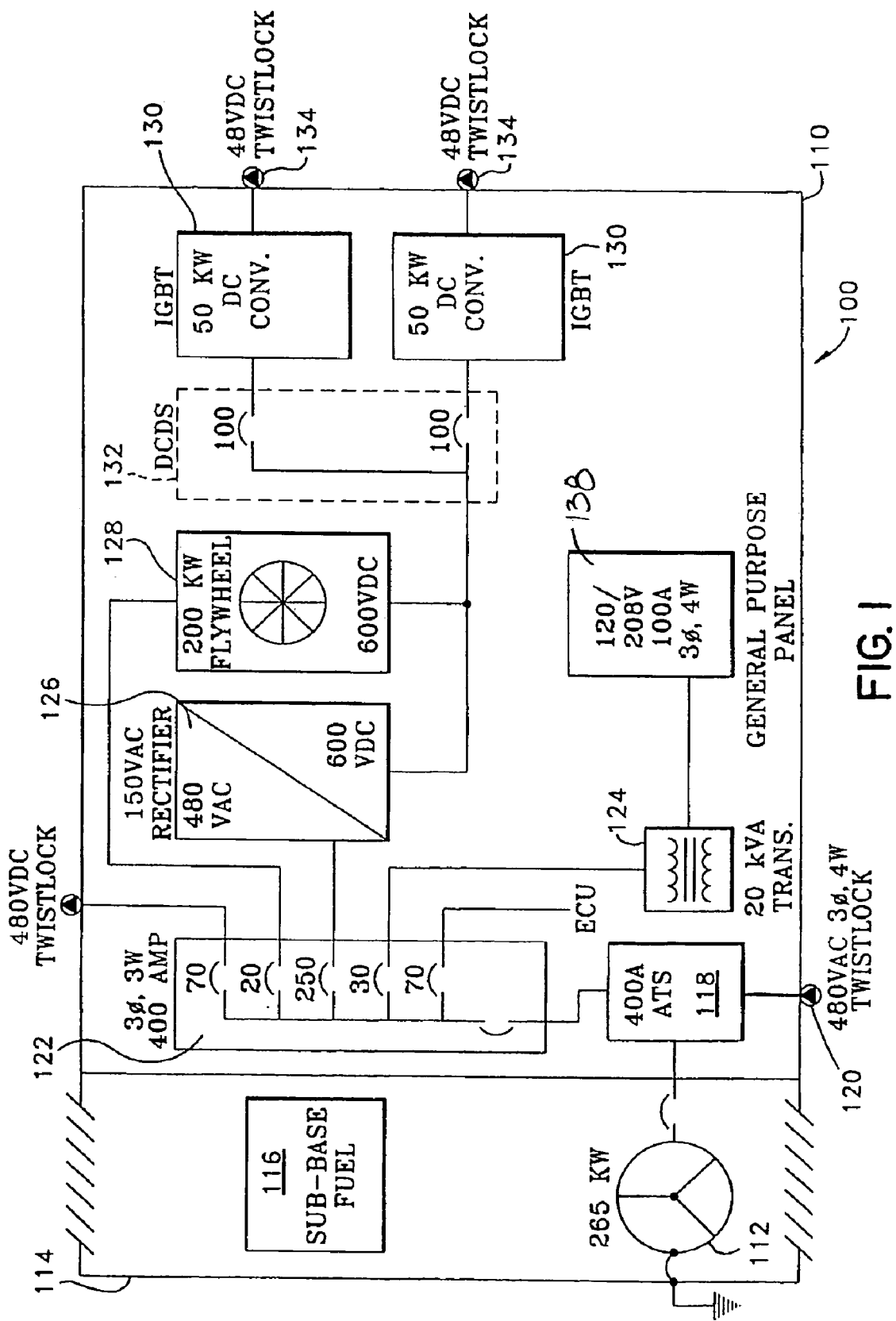
FIG. 1 is a schematic view of a stationary module constructed in accordance with the subject invention.

The present invention overcomes many of the prior art problems associated with power supplies. The advantages, and other features of the system disclosed herein, will become more readily apparent to those having ordinary skill in the art from the following detailed description of certain preferred embodiments taken in conjunction with the drawings which set forth representative embodiments of the present invention and wherein like reference numerals identify similar structural elements.

Referring to FIG. 1, an enclosure 110 is utilized to protect the system 100 from the elements as well as provide the proper internal environment necessary for the component pieces to function properly. This environment is preferably 40-104 degrees F., non-condensing. In a preferred embodiment, the enclosure 110 is an ECOBAY™ enclosure available from Sanmina-SCI Corp. of 2700 North First Street, San Jose, Calif. 95134. The system 100 is designed to be stationary or fixed. The enclosure 110, when stationary, will house all components with the exception of the DC converters. Such a system 100 would typically be utilized in the larger power applications where the 300-600 VDC distribution is sent into the facility (not shown) and powers localized DC converters that step down from 600 to 23-48 VDC. The system 100 will provide an AC power feed that will supply AC three-phase power to air conditioning units within the facility so the enclosure 110 will be considered a self-contained total critical power solution for the facility.

Preferably, generator 112 will be mounted on the outside of the enclosure 110 in an adjacent environmentally designed container 114. The container 114 will mount on extended rails that protrude from the bottom of the enclosure 110. The generator 112 includes a sub-base fuel supply 116 and will start on a signal from an automatic transfer switch (ATS) 118 located inside the enclosure 110. Typically the generator 112 uses a fuel cell or turbine unit sized from 250 kW or larger as required by the application and supplies 208-480 or high VAC three phase. The generator 112 has an output breaker (not shown) and will store up to 12 hours or more of fuel in the sub-base fuel supply 116. The sub-base fuel supply 116 can also be supplied with natural gas to provide for automatic replenishment. The system 100 can be designed to run in a prime energy mode producing inexpensive clean power to the facility, thereby reducing the overall energy usage. By prime energy mode, the system 100 generates power and utilizes the heat by-product to power chillers that cool the system 100. The system 100 can be used stand alone or coupled in parallel for providing additional capacity and/or reliability.

The ATS 118 is preferably sized from 400 to 1200 amps for a VAC three-phase three-wire. Suitable ATSs 118, without limitation, are disclosed in U.S. Pat. Nos. 4,761,563 and 5,646,833, each of which is incorporated herein by reference in its entirety. The ATS 118 is preferably mechanical in nature and fed from two separate sources. One source of power to the ATS 118 is the building utility feed and the other is the feed from the generator 112. The utility, or normal feed, is preferably connected through a twist lock or lug configuration 120 and is terminated to the normal side of the ATS 118. The generator 112 feeds to the emergency side of the ATS 118.

Upon a power outage, the ATS 118 sends a startup signal to the generator 112 and, upon reaching the set voltage, mechanically breaks the utility feed and connects the emergency source supply power, i.e., from generator 112, to the distribution panel 122. This system 100 can be provided with overlap transfer if required and follows the same procedure in reverse when utility is returned. The system 100 can receive a remote start or stop signal and can be utilized in either a prime or standby mode.

The distribution panel 122 distributes 208-480, three-phase three-wire, AC power to all of the component devices. The distribution panel 122 includes a main breaker and smaller distribution breakers, preferably molded case, and are of comparable size and fusing to the ATS 118. A 20-40 kVA transformer 124 is utilized for house power, i.e. lighting, heating, cooling and the like.

A main rectifier, i.e., rectifier 126, takes a 208 volt through medium voltage three-phase feed and produces an output voltage of 300-600 VDC. The sizing range is preferably from 150 kW to 500 kW or as required. Ripple current is minimized by the use of reactors. A DC flywheel 128 can take either AC or DC power to spin up a kinetic flywheel and store energy until such time that the DC output power feed drops below the main rectifier voltage. At a set point, the DC flywheel 128 discharges the stored energy in the form of DC voltage and current to supply consistent power to PCUs 130, providing enough time to allow the generator 112 to come up to speed and take over the utility feed.

Once the utility power source becomes operational again, the DC flywheel 128 will bridge the transfer back to utility in a similar fashion. After the generator 112, or the utility feed has returned and is powering the load, the DC flywheel 128 recharges the kinetic flywheel, in the form of flywheel speed, in readiness to bridge the next power outage. The flywheel system is preferably an enclosed system. In large applications, the DC flywheel 128 is underground and sized in the megawatt range. It will be appreciated by those of ordinary skill in the art that the DC flywheel 128 may be a plurality of kinetic flywheels that are connected in parallel to form the DC flywheel 128.

DC disconnects (DCDS) or breakers, e.g., DC disconnects 132, fuse the PCUs 130. The DC disconnects 132 are sized to accept voltage drop in the event that the voltage output by the flywheel goes below recommended parameters. For example, an unacceptable flywheel voltage drop may occur if the generator 112 miss-starts and must continue to attempt to start and come up to line voltage. As the kinetic flywheel reduces in speed the output voltage drops. As the flywheel voltage drops, the current rises in order to maintain the power output at a constant level.

A pair of PCUs 130 receive power from the rectifier 126. The PCUs 130 reduce the high voltage output by the rectifier 126 for outputting the desired voltage to run the load, i.e., solid state technology devices. In smaller applications such as the 50 kW version illustrated, the PCUs 130 are housed in the enclosure 110. In larger applications such as 150 kW, the PCUs 130 may be located within the building as close to the load as possible. Preferably, the PCUs 130 can be dual fed and have a number of outputs. The PCUs 130 have an N+1 control and power configuration. In a preferred embodiment, the PCUs 130 convert 300-600 VDC to useable 23-48VDC. The PCUs 130 have a high frequency sensing and control circuit for controlling the firing of the IGBTs therein. In controlling the IGBTs in this manner, the physical size of the PCUs 130 is drastically reduced and the efficiency significantly increased. For example, see U.S. Pat. No. 5,646,833.

It is envisioned that the enclosure 110 can be stored outdoors. In the outdoor application, the 48VDC output by the PCUs 130 connects to the building via twist lock quick connection points 134. The output of the PCUs 130 can also be connected to a common feed point either within the building or out at the enclosure 110, to produce a 2+N configuration. Preferably, remote sensors (not shown) are placed at the furthest load point for providing input to the system 100 to maintain the 48VDC output at the furthest utilization point. The system 100 also includes a general purpose panel 138 for allowing access to house power for other applications.

Figure 2:
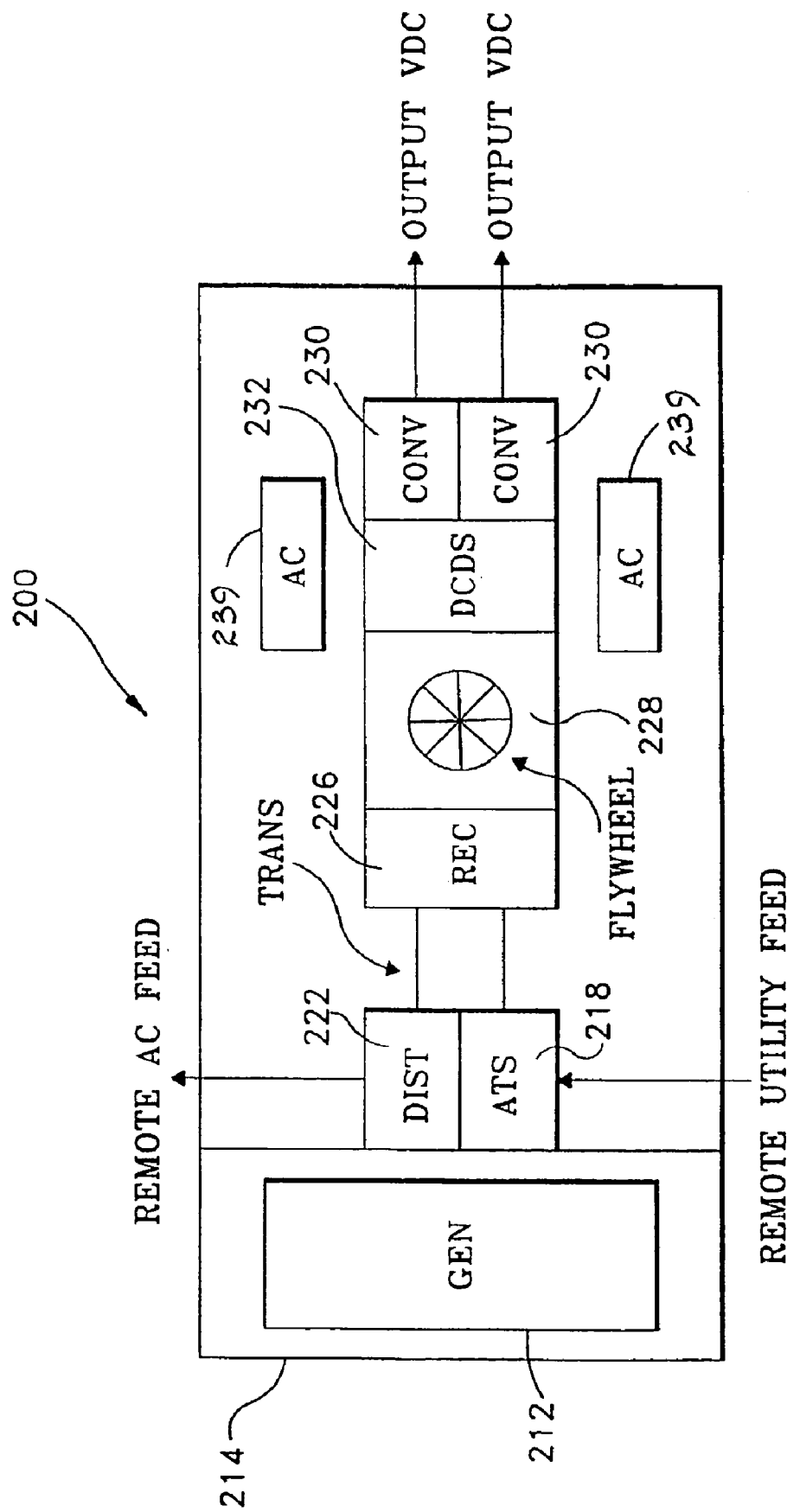
FIG. 2 is a schematic view of a mobile module constructed in accordance with the subject invention.

Referring to FIG. 2, as will be appreciated by those of ordinary skill in the pertinent art, a mobile system 200 utilizes the same principles of the system 100 described above. Accordingly, like reference numerals preceded by the numeral "2" instead of the numeral "1", are used to indicate like elements. The mobile system 200 is designed to allow easy movement from one area to another so that high quality power can be quickly made accessible in the area of need. The mobile system 200 houses air conditioners, i.e., AC 239, and all the components, and the output voltage is sent into the facility from the enclosure 210. Typically, the mobile system 200 is used in a smaller demand application of 1000-1500 amps VDC.

Figure 3B:
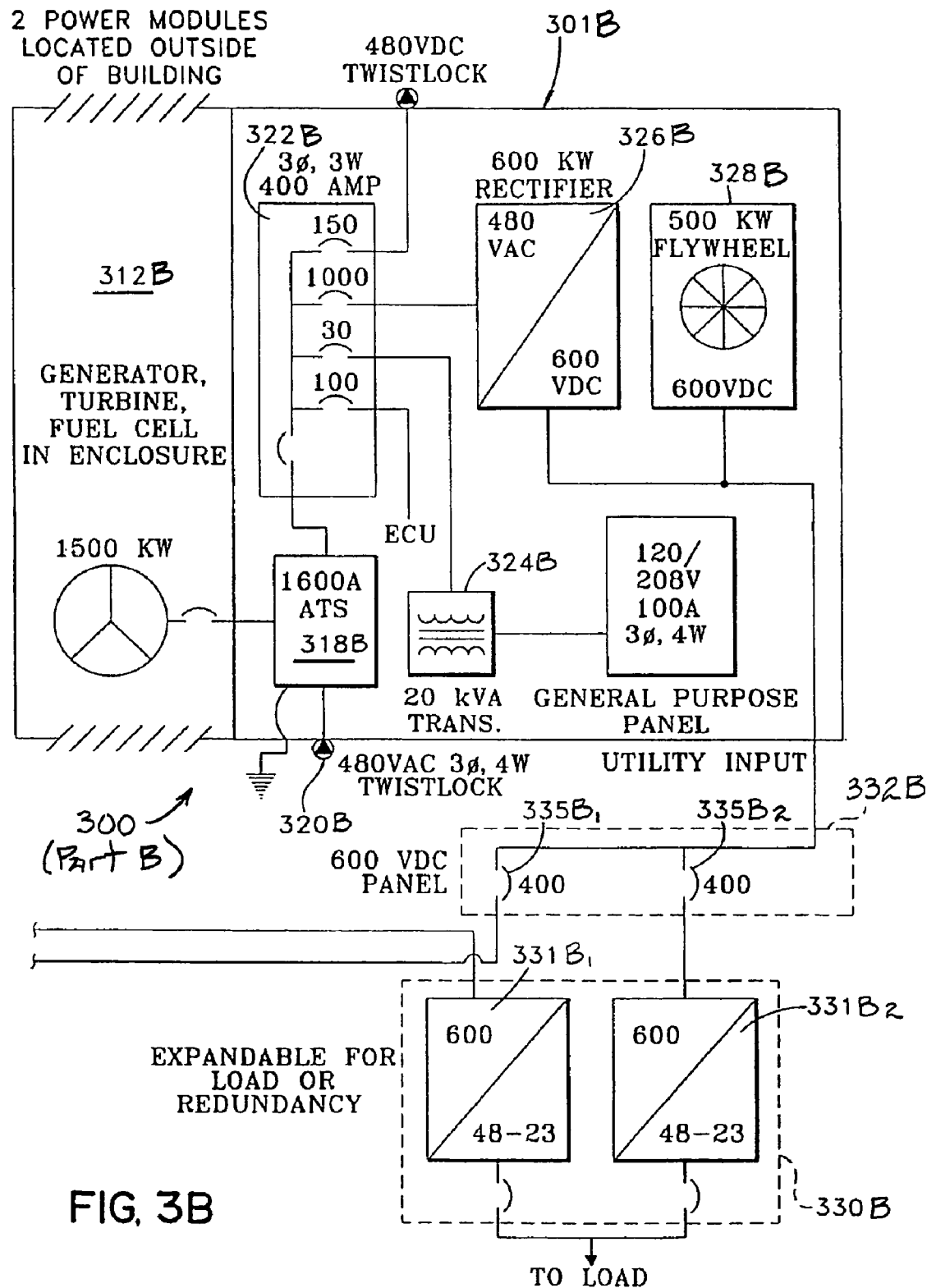
FIG. 3 is a schematic view of a third module constructed in accordance with the subject invention.

Referring to FIG. 3, as will be appreciated by those of ordinary skill in the pertinent art, an expanded system 300 utilizes the same principles of the systems 100 and 200 described above. The system 300 utilizes cross-feeding stand-alone converters in order to insure reliable delivery of power. Accordingly, like reference numerals preceded by the numeral "3" instead of the numerals "1" or "2", are used to indicate like elements whenever possible. The system 300 is adapted and configured to supply power to a data center (not shown). Typically, data centers require power that is conditioned and backed up by an uninterruptible power supplies (hereinafter "UPS"), batteries, or generators. Power distribution units (hereinafter "PDU") typically distribute 480 volt three-phase power. For use, the power may be transformed to usable 120/208 volt power. The system 300 is an expanded application to meet the needs of a data center.

For redundancy, the system 300 includes a pair of power modules 301A and 301B, a pair of distribution panels, 332A and 332B, and a pair of PCUs 330A and 330B. PCU 330A houses a pair of DC converter units 331A1 and 331A2, and similarly, PCU 330B houses a pair of DC converter units 331B1 and 331B2. The power modules 301A, 301B include a generator 312A, 312B, respectively, either prime or standby, that could also be one or more fuel cells or a turbine. In an energy saving mode, wherein the generator 312A, 312B or utility source utilizes natural gas to produce electrical power, the byproduct heat of the generation is utilized to power absorption chillers that are, in turn, used to cool the data center, or the PCUs 330A, 330B. Preferably, the PCUs 330A, 330B accept chilled water as a cooling medium, e.g., load curtailment.

The PCUs 330A, 330B are located inside the data center as close to the 48VDC load as possible. This will allow the rectification of the AC power to DC for distribution outside of the data center in a remote location, thereby saving valuable data center space. The use of transformers and associated alternating current apparatus is no longer necessary; as a result, the data center is less electronically intensive. In another embodiment, the need for SMPS on the servers can be eliminated and the servers run on DC voltage supplied in a central power feed scenario by the system 300. The elimination of SMPS significantly reduces the overall heat and power draw and by virtue of reducing power and cooling space is freed up or can be more densely designed to accommodate more equipment per square foot. The PCUs 330A, 330B in a 2+N scenario can be applied and can simply and effectively provide the computers with reliable power meeting or exceeding the state of the art 3 to 5 nines availability requirements. In short, the data center is less electronically intensive due to the replacing of the AC-DC back to AC topologies of the UPS as well as eliminating the sophistication and expense of the AC sine wave reconstruction, synchronization and paralleling electronics. The system 300 in conjunction with a PCR saves installation expense, operating expense in cooling, and infrastructure space necessary for all of the required AC power equipment.

In a preferred embodiment, the system 300 produces a distribution DC voltage of 600VDC from outside of the data center. Typically, the sizing of the system 300 could be up to 2 MW. The 600VDC is produced by a rectification system 326A, 326B with a DC flywheel 328A, 328B for providing transition to a backup generator 312A, 312B as explained above. It is envisioned that the conversion for the data center application from 600-48VDC is accomplished using the PCUs 330A, 330B at a sizing of roughly 150 kW.

Each PCU 330A, 330B can receive two 600VDC power feeds, i.e., one from each of the power modules 301A, 301B, so that if a single power module 301A or 301B malfunctions, the 48VDC output of the system 330 is maintained. The distribution panel 332A is between the power module 301A and the PCU 330A, and similarly, the distribution panel 332A is between the power module 301B and the PCU 330B. The distribution panels 332A and 332B have DC breakers or fuses 335A1, 335A2, 335B1 and 335B2, utilized to protect the inputs of the DC converter units 331A1, 331A2, 331B1 and 331B2.

Figure 4:
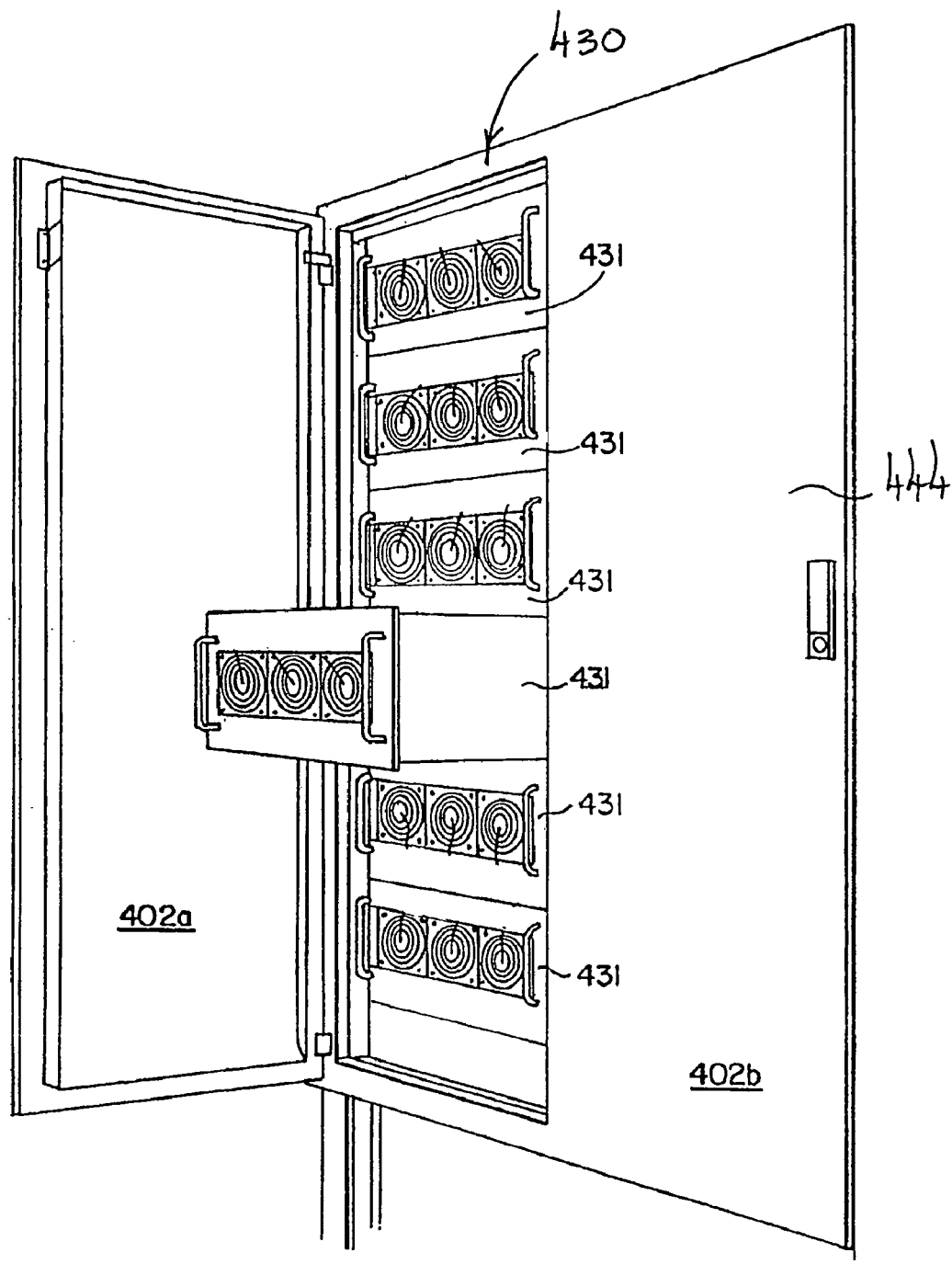
FIG. 4 is a perspective view of an enclosure for providing DC power and cooling in accordance with the subject invention.

FIG. 4 shows an embodiment of a PCR 444 that houses a PCU 430 that includes a plurality of DC converter units 431. PCR 444 will eliminate the heat produced by PCU 430 or computers installed into the PCR 444, through the utilization of local chilled water supply and chilled water return piping (not shown). PCR 444 has a dual role as the housing and cooling apparatus for the PCU 430 as well as cooling racks for computer technology installed into the free standing racks within the PCR 444. The PCR 444 has a lineup of racks that provide power, cooling and structural requirements for the computer systems therein. The racks water cool the DC converter units 431, thus allowing more technology in the space without the requirement of separate air conditioning units, reducing even further the floor space necessary to support the computers in the data or telecommunications processing area.

PCR 444 is suitable for providing DC power to a commercial building. PCR 444 has two doors 402a, 402b for providing access to an interior thereof. Behind door 402a, the PCR 444 houses a plurality of DC conversion units 431 and, behind door 402b, a load (not shown). Also enclosed in each rack is a chilled water cooling coil (not shown) and a plurality of variable frequency drive fans (not shown) that cool the internal air in the PCR 444 so that heat from the power or computer devices is rejected into the water. In the preferred embodiment shown, the PCR 444 has six DC converter units 431 of 30 kW capacity each. As a result, the PCR 444 can serve as a redundant 150 kW DC power source.

Figure 5:
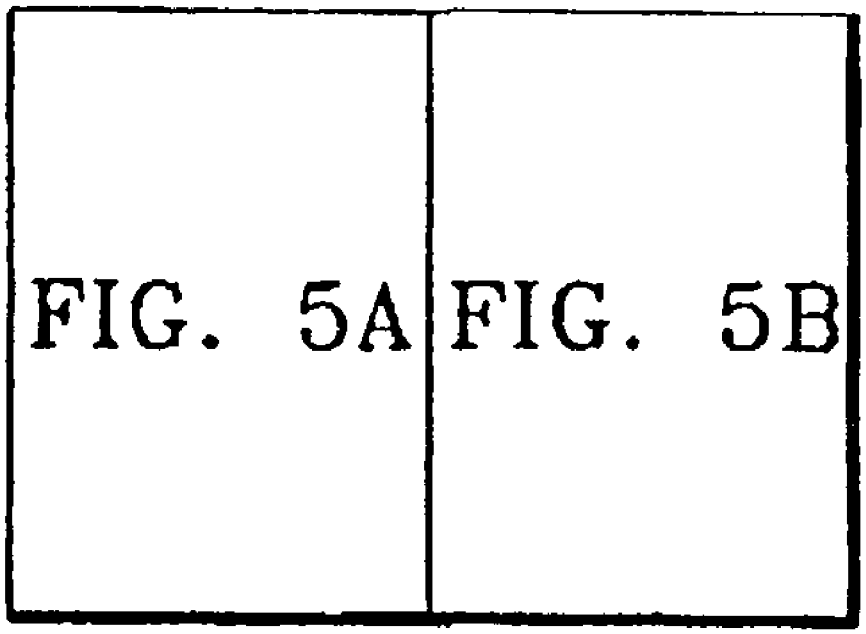
FIG. 5 is a schematic view of a connected DC conversion unit FIG. 4 in accordance with the subject invention.
Figure 5A:
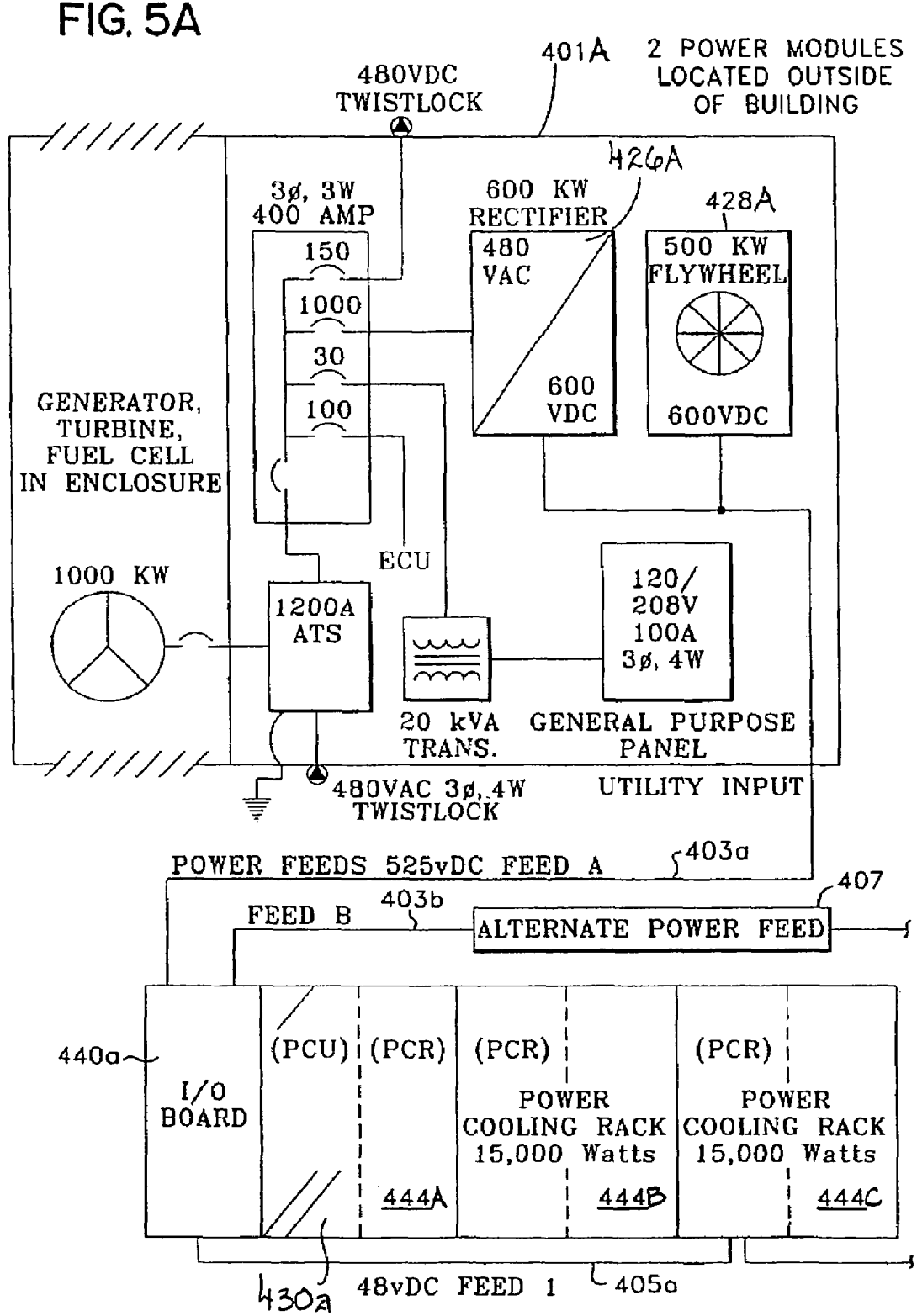
Figure 5B:
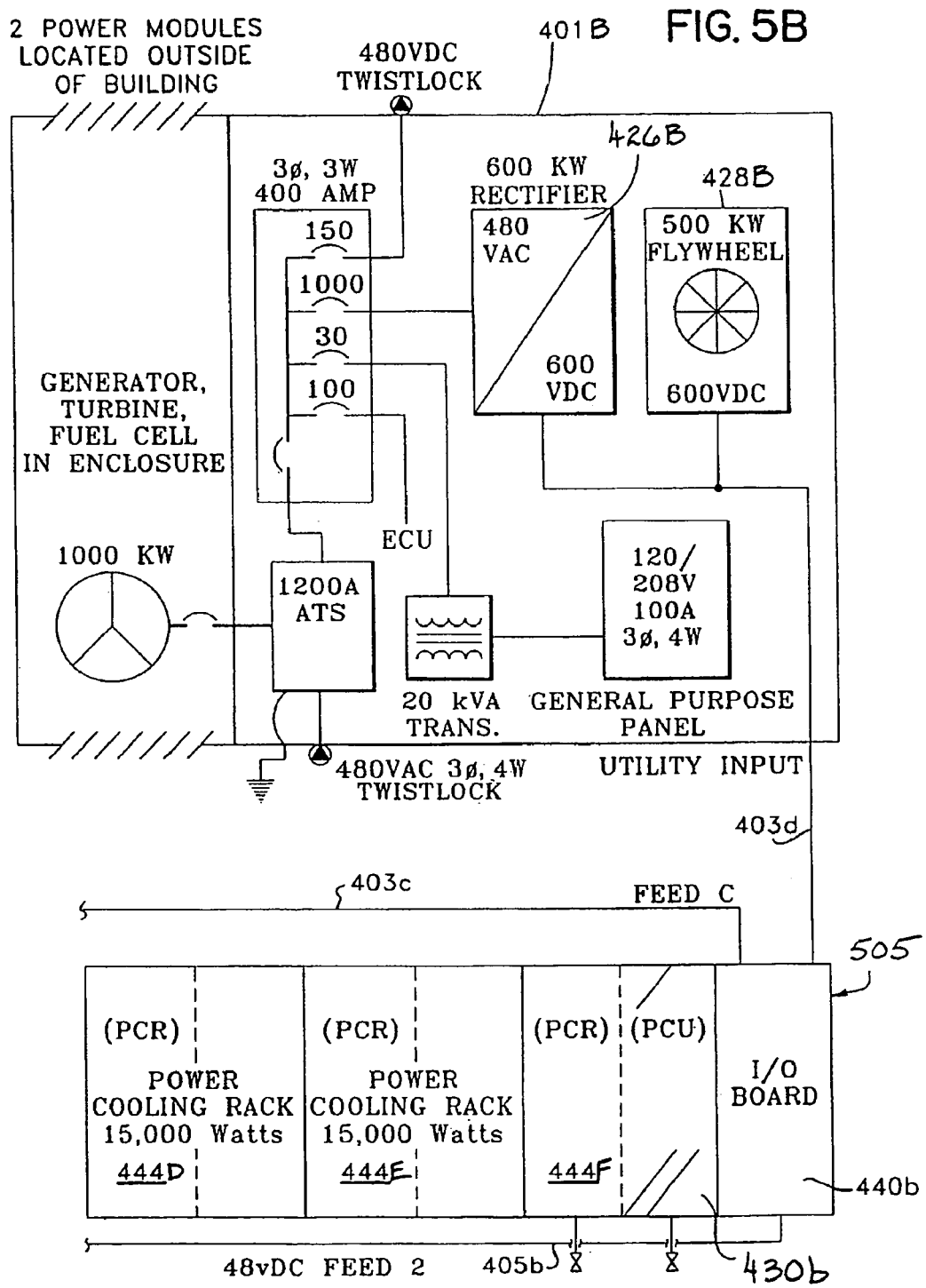

FIG. 5 is a schematic view of an exemplary DC conversion system 505 connected to dual power sources 401A and 401B.

As can be seen, the high voltage DC (for example 525 VDC) is distributed relatively easily and efficiently, and near or at the point of consumption, the voltage level is reduced to a usable level (for example 48VDC). Four 525 VDC power feeds 403a-d provide input power to the DC conversion system 505. 525 VDC power feeds 403a and 403d are connected to power modules 401A and 401B, respectively. The power modules 401A and 401B utilize similar principles as systems 100, 200 and 300. Thus, for simplicity, no significant discussion of the theory and operation is repeated again. Of note, the power modules 401A and 401B each include dual high DC voltage sources, namely a rectifier 426A or 426B, and a flywheel system 428A or 428B, in order to increase the available duration and load capacity of power during the interim mode. 525 VDC power feeds 403b and 403c are connected to alternate power sources 407. The alternate power sources 407 are preferably traditional utilities. In other embodiments, the alternate power sources 407 are fuel cells, batteries, UPS, other generators, additional power modules similar to power modules 401A and 401B, and combination thereof.

Figure 6:
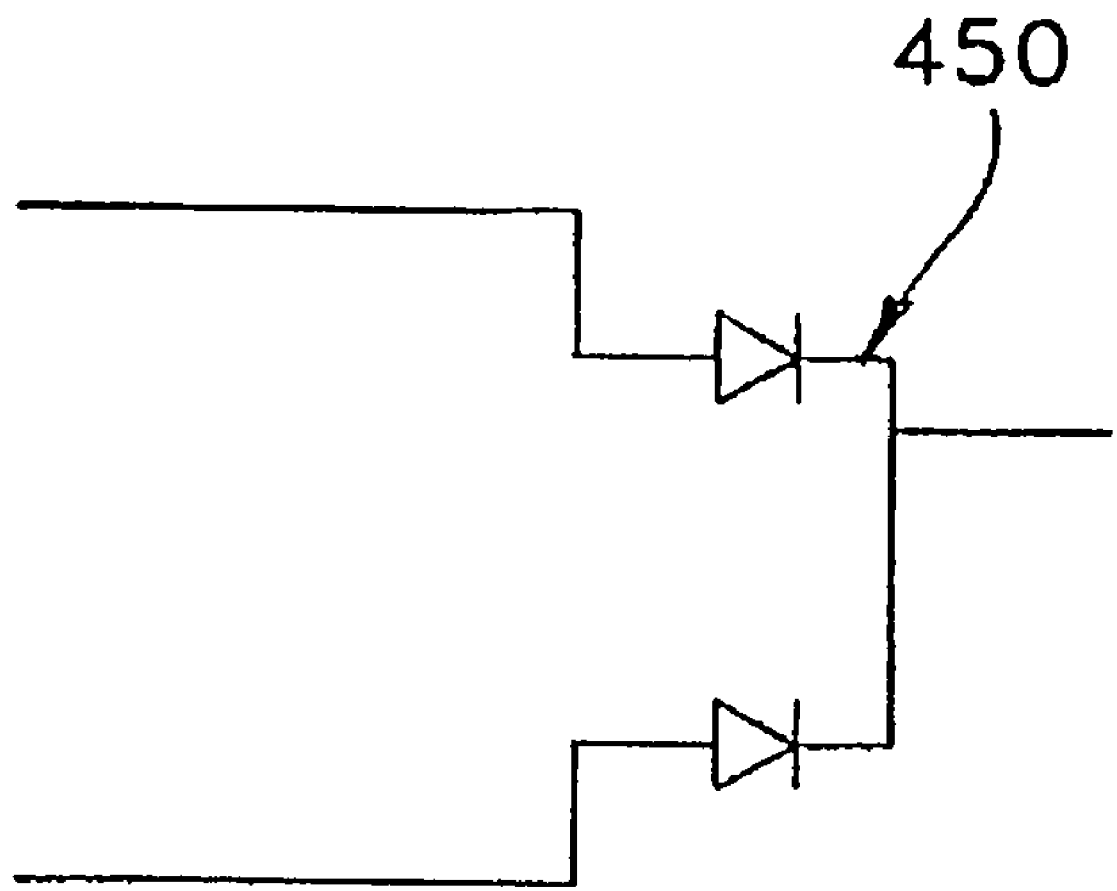
FIG. 6 is a schematic of a diode bridge constructed in accordance with the subject invention.

Still referring to FIG. 5, the DC conversion system 505 includes two I/O boards 440a, 440b. The I/O boards 440a, 440b act to direct the input power to adjacent PCUs 430a, 430b. I/O board 440a receives 525 VDC power feeds 403a and 403b. I/O board 440b receives 525 VDC power feeds 403c and 403d. Each I/O board 440a, 440b routes the respective two 525 VDC power feeds (403a and 403b, or 403c and 403d) through a diode bridge 450 (see FIG. 6). The diode bridge 450 is for maintaining a consistent output regardless of the polarity on the inputs to diode bridge 450. As a result, for example, if 525 VDC power feed 403a malfunctions (and 525 VDC power feeds 403b and 403c also malfunction, for that matter), the proper amount of power is still available to allow PCUs 430a and 430b to produce sufficient power to run the load. The redundancy of two PCUs 430a, 430b that are each fed by two 525 VDC power feeds 440a and 440b, or 440c and 440d, respectively, wherein each 525 VDC power feed 440a-d is derived from a different source, results in a highly robust and reliable system.

Each PCU 430a and 430b produces sufficient power to run the load. In turn, the output from the PCUs 430a and 430b is routed through a plurality of power cooling racks 444A-F. The PCRs 444A-F connect the respective outputs of the PCUs 430a and 430b via another diode bridge (not shown) in order to allow a single functioning PCU 430a or 430b to sufficiently power the load. The PCRs 444A-F also distribute the power to the load, i.e. the technologies or computers in the PCRs 444A-F. The power enters the PCRs 444A-F through 48 VDC power feeds 405a, 405b. A diode bridge (see FIG. 6) within the PCRs 444A-F receives 48 VDC power feeds 405a, 405b so that only one of the 48 VDC power feeds 405a, 405b needs to be operable in order for the system to provide power.

Each of the PCUs 430a and 430b generates significant heat that needs to be removed to insure proper operation. The PCRs 444A-F are water cooled but it will be appreciated that other methods of cooling are possible as would be appreciated by those of ordinary skill in the art based upon review of the subject disclosure. In a well-known manner, each PCU 430a or 430b may be replaced or reconfigured to allow varying the capacity and performance of the PCRs 444A-F to suit the particular application.

Figure 7:
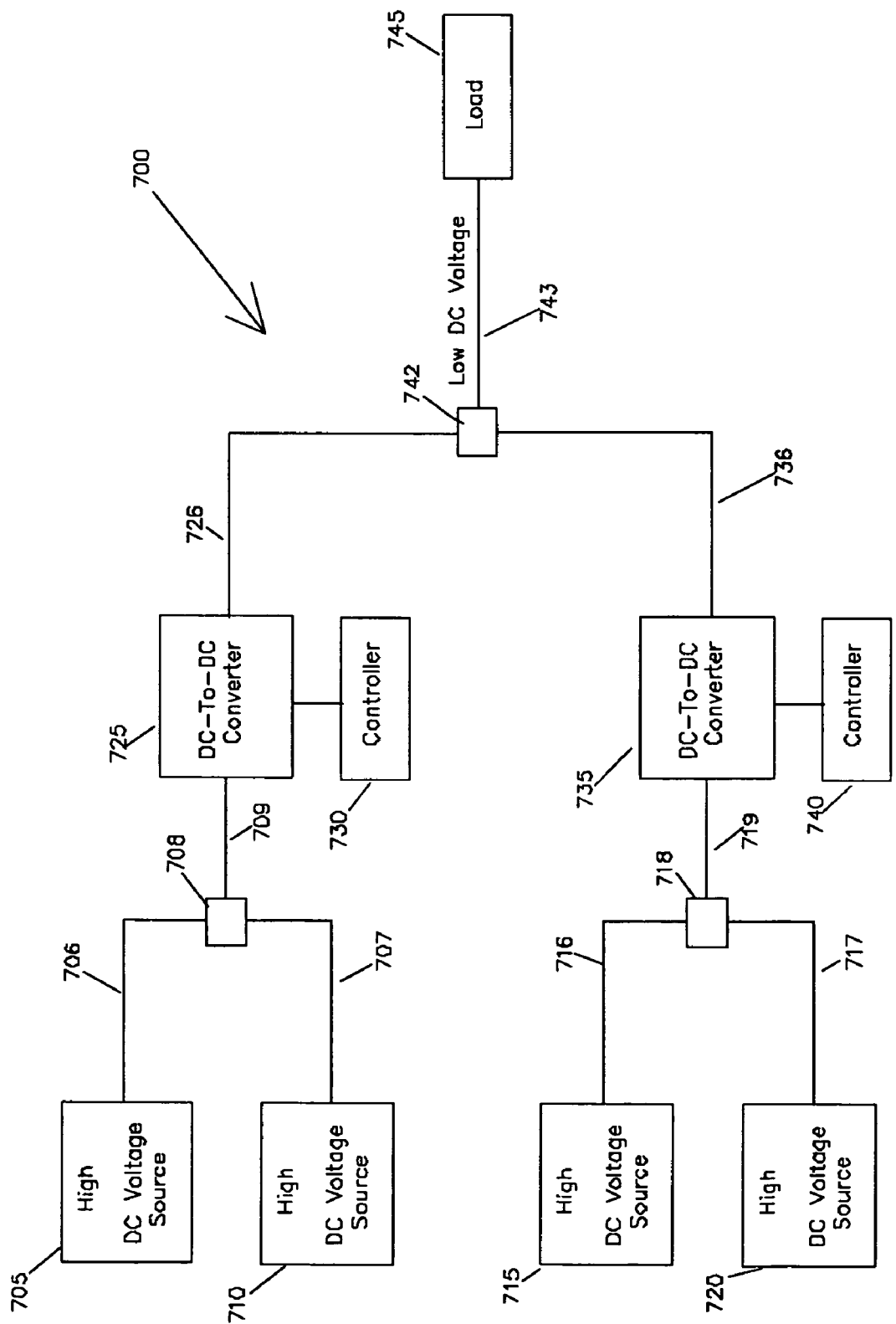
FIG. 7 is a block diagram of a system that provides a highly reliable low DC voltage to a load.

FIG. 7 is a block diagram of a system 700 that provides a highly reliable low DC voltage to a load 745. System 700 includes high DC voltage sources 705, 710, 715 and 720, DC-to-DC converters 725 and 735, controllers 730 and 740, and bridges 708, 718 and 742.

High DC voltage source 705 provides a high DC voltage 706 to bridge 708, and high DC voltage source 710 provides a high DC voltage 707 to bridge 708. Bridge 708 couples high DC voltage 706 and high DC voltage 707 to provide a redundant high DC voltage feed 709 to DC-to-DC converter 725. Bridge 708 maintains a consistent output for redundant high DC voltage feed 709 so that even if one of high DC voltage source 705 or high DC voltage source 710 fails, high DC voltage feed 709 will still be operational. Each of high DC voltage 706, high DC voltage 707, and the voltage on high DC voltage feed 709 are in a range of about 300 to 600 VDC.

High DC voltage source 715 provides a high DC voltage 716 to bridge 718, and high DC voltage source 720 provides a high DC voltage 717 to bridge 718. Bridge 718 couples high DC voltage 716 and high DC voltage 717 to provide a redundant high DC voltage feed 719 to DC-to-DC converter 735. Bridge 718 maintains a consistent output for redundant high DC voltage feed 719 so that even if one of high DC voltage source 715 or high DC voltage source 720 fails, high DC voltage feed 719 will still be operational. Each of high DC voltage 716, high DC voltage 717, and the voltage on high DC voltage feed 719 are in a range of about 300 to 600 VDC.

DC-to-DC converter 725 utilizes an IGBT to scale the high DC voltage from high DC voltage feed 709 to a low DC voltage 726. Controller 730 controls a firing rate of DC-to-DC converter 725 so that low DC voltage 726 is in a range of about 23 to 48 VDC.

DC-to-DC converter 735 utilizes an IGBT to scale the high DC voltage from high DC voltage feed 719 to a low DC voltage 736. Controller 740 controls a firing rate of DC-to-DC converter 735 so that low DC voltage 736 is in a range of about 23 to 48 VDC.

Bridge 742 couples low DC voltage 726 and low DC voltage 707 to provide a redundant low DC voltage feed 743 to load 745. Bridge 742 maintains a consistent output for redundant low DC voltage feed 743 so that even if one of low DC voltage 726 or low DC voltage 736 becomes unavailable, low DC voltage feed 743 will still be operational.

While the invention has been described with respect to preferred embodiments, those skilled in the art will readily appreciate that various changes and/or modifications can be made to the invention without departing from the spirit or scope of the invention.

What is claimed is:

1. A system comprising:
    a first power feed that distributes a first high DC voltage in a building, wherein said first high DC voltage is in range of about 300 to 600 VDC;
    a first converter, coupled to said first power feed, that receives said first high DC voltage, and scales said first high DC voltage to a first low DC voltage;
    a first controller that controls a firing rate of said first converter so that said first low DC voltage is in a range of about 23 to 48 VDC;
    a second power feed that distributes a second high DC voltage in said building, wherein said second high DC voltage is in a range of about 300 to 600 VDC;
    a second converter, coupled to said second power feed, that receives said second high DC voltage, and scales said second high DC voltage to a second low DC voltage;
    a second controller that controls a firing rate of said second converter so that said second low DC voltage is in a range of about 23 to 48 VDC;
    a bridge that couples said first and second low DC voltages to provide a low DC voltage feed,
    wherein said low DC voltage feed provides power at a level that is about equal to a sum of (a) power provided by said first converter and (b) power provided by said second converter; and
    first and second sources for said first and second high DC voltages, respectively, each of said first and second high DC voltage sources comprises a rectifier that receives an AC voltage and converts said AC voltage to a high DC voltage.

2. The system of claim 1, wherein said first and second high DC voltage sources each further comprises a flywheel that stores energy, and that discharges said energy to provide a high DC voltage.

3. The system of claim 2, wherein said AC voltage is in a range of about 208 to 480 VAC.

4. The system of claim 1, wherein said first and second high DC voltage sources each further comprises a device selected from the group consisting of a rectifier, a fuel cell, a battery, an uninterruptible power supply and a generator.

5. The system of claim 1, wherein each of said first and second converters provides greater than or equal to about 30 kW of power.

* * * * *